(12) United States Patent
Uehara et al.

(10) Patent No.: US 12,249,305 B2
(45) Date of Patent: Mar. 11, 2025

(54) INFORMATION PROCESSING METHOD, INFORMATION PROCESSING DEVICE AND A NON-TRANSITORY STORAGE MEDIUM

(71) Applicant: YAMAHA CORPORATION, Hamamatsu (JP)

(72) Inventors: Misa Uehara, Hamamatsu (JP); Akira Maezawa, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 726 days.

(21) Appl. No.: 17/204,340

(22) Filed: Mar. 17, 2021

(65) Prior Publication Data

US 2021/0201865 A1 Jul. 1, 2021

Related U.S. Application Data

(63) Continuation of application No. PCT/JP2019/034188, filed on Aug. 30, 2019.

(30) Foreign Application Priority Data

Sep. 19, 2018 (JP) .................................. 2018-174785

(51) Int. Cl.
*G10H 1/00* (2006.01)
*G06N 3/08* (2023.01)

(52) U.S. Cl.
CPC .............. *G10H 1/0008* (2013.01); *G06N 3/08* (2013.01); *G10H 2210/155* (2013.01); *G10H 2220/026* (2013.01); *G10H 2220/221* (2013.01); *G10H 2250/311* (2013.01)

(58) Field of Classification Search
CPC .......... G10H 1/0008; G10H 2210/155; G10H 2220/026; G10H 2220/221; G10H 2250/311; G06N 3/08
See application file for complete search history.

(56) References Cited

U.S. PATENT DOCUMENTS

| 5,523,522 A | 6/1996 | Koseki et al. |
| 6,025,550 A | 2/2000 | Kato |
| 2009/0022331 A1* | 1/2009 | DeBoer ................ G10H 1/0091 706/22 |
| 2013/0291708 A1* | 11/2013 | Orshan ................ G10H 1/0091 84/626 |

(Continued)

FOREIGN PATENT DOCUMENTS

| CN | 1239251 A | 12/1999 |
| JP | 2001290474 A | 10/2001 |

(Continued)

OTHER PUBLICATIONS

Office Action issued in Japanese Appln. No. 2022-098702 on Feb. 9, 2023. English machine translation provided.

(Continued)

*Primary Examiner* — Jianchun Qin
(74) *Attorney, Agent, or Firm* — ROSSI, KIMMS & McDOWELL LLP

(57) ABSTRACT

An information processing method implemented by a computer, the information processing method including, generating pedal data representing an operation period of a pedal that extends sound production by key depression, from playing data representing a playing content.

18 Claims, 4 Drawing Sheets

(56) References Cited

U.S. PATENT DOCUMENTS

| | | | |
|---|---|---|---|
| 2019/0237055 A1 | | 8/2019 | Maezawa |
| 2020/0066271 A1* | | 2/2020 | Li .......................... G10L 15/18 |

FOREIGN PATENT DOCUMENTS

| | | | |
|---|---|---|---|
| JP | 2005301299 A | | 10/2005 |
| JP | 2017102414 A | | 6/2017 |
| JP | 2017102415 A | * | 6/2017 |
| JP | 2018063295 A | | 4/2018 |

OTHER PUBLICATIONS

English translation of Written Opinion issued in Intl. Appln. No. PCT/JP2019/034188 mailed on Nov. 26, 2019, previously cited in IDS filed Mar. 17, 2021.

International Preliminary Report on Patentability issued in Intl. Appln. No. PCT/JP2019/034188 mailed on Apr. 1, 2021. English translation provided.

International Search Report issued in International Application No. PCT/JP2019/034188 mailed Nov. 26, 2019. English translation provided.

Written Opinion issued in International Application No. PCT/JP2019/034188 mailed Nov. 26, 2019.

Extended European Search Report issued in European Appln. No. 19862004.9 mailed May 3, 2022.

Eyben. "Universal Onset Detection with Bidirectional Long Short-Term Memory Neural Networks." 11th International Society for Music Information Retrieval Conference. Jan. 2010: 589-594.

Karioun. "Deep Learning in Automatic Piano Transcription." Aug. 19, 2018: 1-68. Retrieved on Apr. 19, 2022. URL: https://dial.uclouvain.be/memoire/ucl/fr/object/thesis%3A17184/datastream/PDF_1.

Liang. "Piano Legato-Pedal Onset Detection Based on a Sympathetic Resonance Measure." 2018 26th European Signal Processing Conference. Sep. 3, 2018: 2484-2488.

Bock. "Polyphonic Piano Note Transcription with Recurrent Neural Networks." 2012 IEEE International Conference on Acoustics, Speech and Signal Processing. Mar. 25-30, 2012: 121-124.

Office Action issued in Chinese Appln. No. 201980058992.4, mailed on Oct. 30, 2023. English machine translation provided.

* cited by examiner

INFORMATION PROCESSING METHOD, INFORMATION PROCESSING DEVICE AND A NON-TRANSITORY STORAGE MEDIUM

CROSS-REFERENCE TO RELATED APPLICATIONS

This application is a continuation application of International Application No. PCT/JP2019/034188, filed on Aug. 30, 2019, which claims priority to Japanese Patent Application No. 2018-174785 filed in Japan on Sep. 19, 2018. The entire disclosures of International Application No. PCT/JP2019/034188 and Japanese Patent Application No. 2018-174785 are hereby incorporated herein by reference.

BACKGROUND

Technological Field

The present disclosure relates to a technique for processing playing data.

Background Information

Technologies for generating various data from data representing a music piece have been proposed. For example, Japanese Patent Application Laid-Open Publication No. 2017-102415 discloses a performance system that generates a control signal for driving a piano pedal. The control signal is generated from music piece data in which a timing of a key operation and a timing of a pedal operation are defined, and musical instrument digital interface (MIDI) data according to an operation of a piano key.

SUMMARY

The technique requires music piece data that individually represents a key operation and a pedal operation. However, in some cases, it is only possible to prepare music piece data that exclusively defines a sound production period of each key without distinguishing between a key operation and a pedal operation. In consideration of such circumstance, an object of one aspect of the present disclosure is to generate data representing a pedal operation.

In order to solve the above problem, an information processing method according to one aspect of the present disclosure includes generating pedal data representing an operation period of a pedal that extends sound production by key depression, from playing data representing a playing content. In this aspect, the generating can include further generating key depression data representing a key depression period. Further, the key depression data can be data representing a key depression period of a key corresponding to each of a plurality of pitches.

An information processing device according to another aspect of the present disclosure includes a generation module that generates pedal data representing an operation period of a pedal that extends sound production by key depression, from playing data representing a playing content. In this aspect, the generation module can further generate key depression data representing a key depression period. Further, the key depression data can be data representing a key depression period of a key corresponding to each of a plurality of pitches.

DETAILED DESCRIPTION OF THE EMBODIMENTS

Selected embodiments will now be explained in detail below, with reference to the drawings as appropriate. It will be apparent to those skilled from this disclosure that the following descriptions of the embodiments are provided for illustration only and not for the purpose of limiting the invention as defined by the appended claims and their equivalents.

First Embodiment

Figure 1:
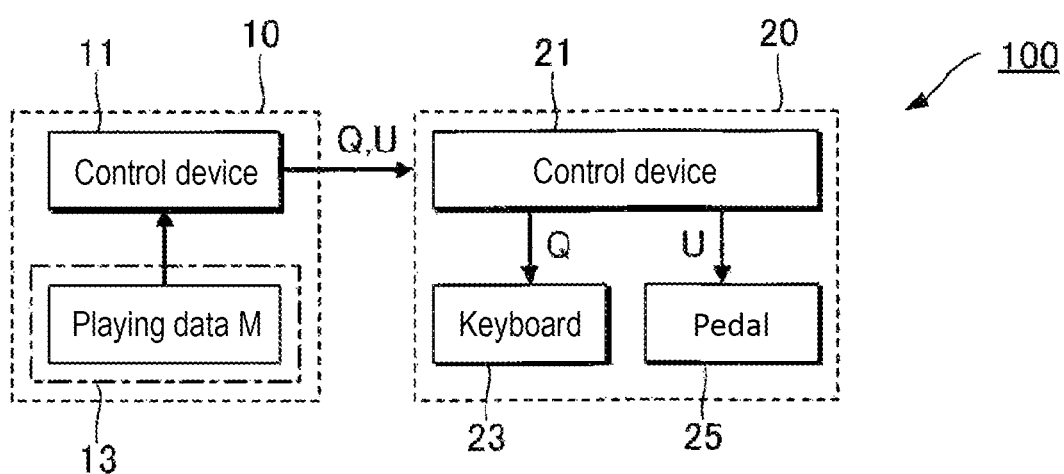
FIG. 1 is a block diagram illustrating a configuration of an automatic playing system according to a first embodiment of the present disclosure.

FIG. 1 is a block diagram illustrating a configuration of an automatic playing system 100 according to a first embodiment of the present disclosure. The automatic playing system 100 is a computer system that automatically plays a music piece. As illustrated in FIG. 1, the automatic playing system 100 includes an information processing device 10 and an automatic playing musical instrument 20. The information processing device 10 is a computer system that generates various data to be used for automatic playing by the automatic playing musical instrument 20, from data (hereinafter referred to as "playing data") M representing a playing content. As the information processing device 10, for example, an information terminal such as a mobile phone, a smartphone, or a personal computer is used.

The automatic playing musical instrument 20 is a keyboard musical instrument that performs automatic playing based on various data generated by the information processing device 10. As the automatic playing musical instrument 20, for example, an automatic playing piano is exemplified. As illustrated in FIG. 1, the automatic playing musical instrument 20 includes a keyboard 23 including a plurality of keys individually used for sound production of a plurality of different pitches, and a pedal 25 that extends sound production by key depression. The information processing device 10 and the automatic playing musical instrument 20 are connected, for example, by wire or wirelessly. The information processing device 10 can be mounted on the automatic playing musical instrument 20.

As illustrated in FIG. 1, the information processing device 10 of the first embodiment includes an electronic controller 11 and a storage device 13. The electronic controller 11 is a processing circuit processor such as a central processing unit (CPU), and comprehensively controls each element of the information processing device 10. The term "electronic controller" as used herein refers to hardware that executes software programs. The electronic controller 11 can be configured to comprise, instead of the CPU or in addition to the CPU, programmable logic devices such as a DSP (Digital Signal Processor), an FPGA (Field Programmable Gate Array), and the like. In addition, the electronic controller 11 can include a plurality of CPUs (or a plurality of programmable logic devices). The storage device 13 stores a program to be executed by the electronic controller 11 and various data to be used by the electronic controller 11. As the storage device 13, for example, a known recording medium such as a magnetic recording medium or a semiconductor recording medium is used. Note that the storage device 13 can be configured by a combination of a plurality of types of recording media. Further, as the storage device 13, it can be possible to use a portable recording medium attachable to and detachable from the information processing device 10, or an external recording medium (for example, an online storage) that the information processing device 10 can communicate with via a communication network.

Figure 2:
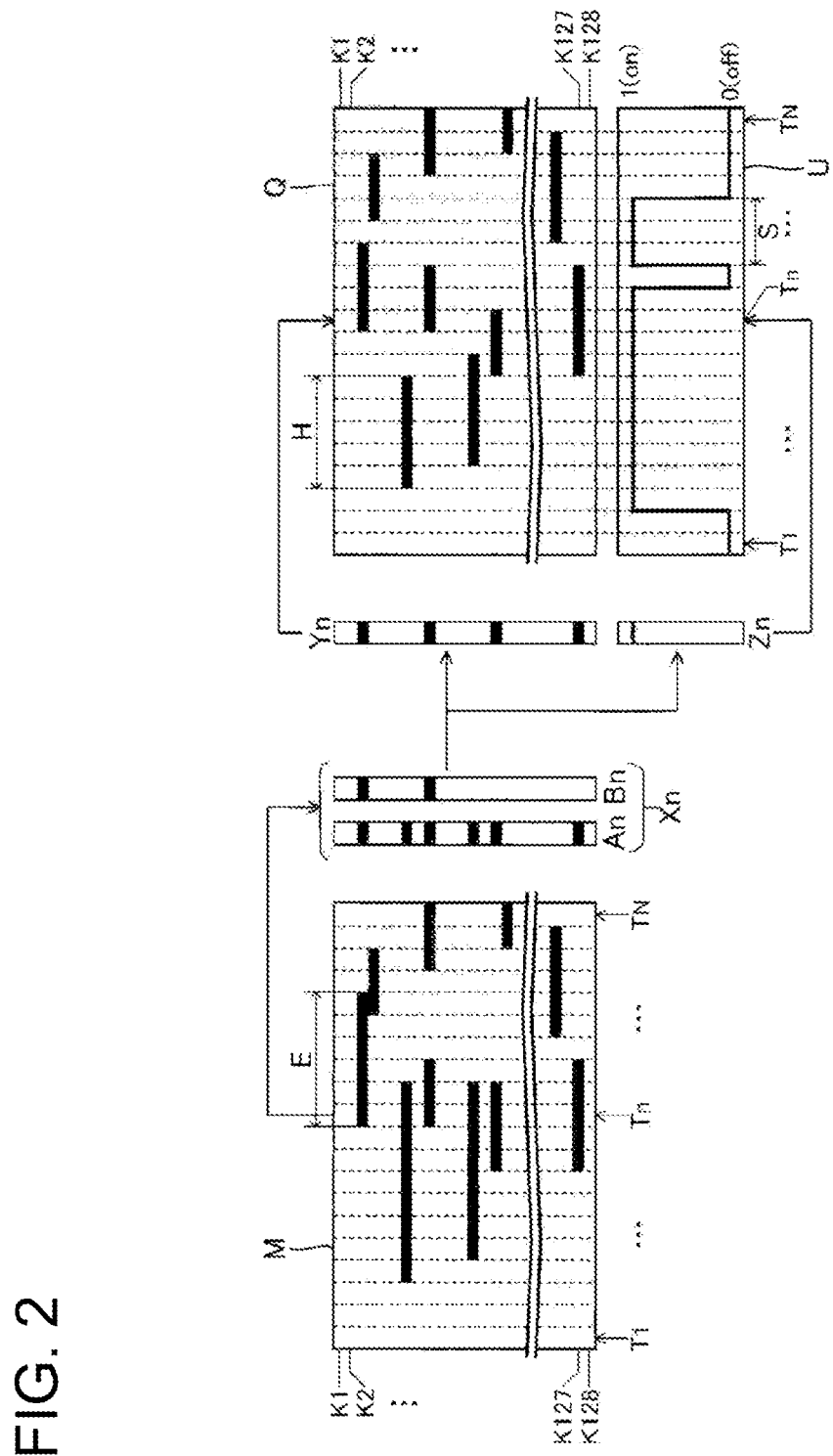
FIG. 2 is a schematic diagram of playing data, key depression data, and pedal data.

The storage device 13 of the first embodiment stores the playing data M of a music piece to be played by the automatic playing musical instrument 20. FIG. 2 schematically shows the playing data M. The playing data M is data representing a sound production period E for each of a plurality of pitches K. The sound production period E is a period from the time of starting sound production of a musical tone of each pitch K to the time of muting the sound. In FIG. 2, for each of 128 pitches K1 to K128, data representing the sound production period E in time series is illustrated as the playing data M. As the playing data M, MIDI data compliant with the MIDI standard is exemplified. For example, the playing data M is generated from an acoustic signal obtained by collecting playing sound of a piano played by a performer, with a sound collecting device (for example, a microphone). For example, the acoustic signal is separated into band components for individual pitches K, and a section having intensity of each band component exceeding a threshold value is extracted as the sound production period E. Note that the playing data M is also generated by a similar method from an acoustic signal that is recorded in advance and stored in a recording medium such as a CD. For generation of the playing data M, any known transcription technique is adopted.

As illustrated in FIG. 2, the playing data M of the first embodiment is sectioned into N unit periods T1 to TN that are different on a time axis. A unit period Tn (1≤n≤N) is, for example, a period (frame) having a time length of about several tens of milliseconds to several hundreds of milliseconds. The sound production period E of each pitch K can be continuous over a plurality of unit periods Tn.

Figure 3:
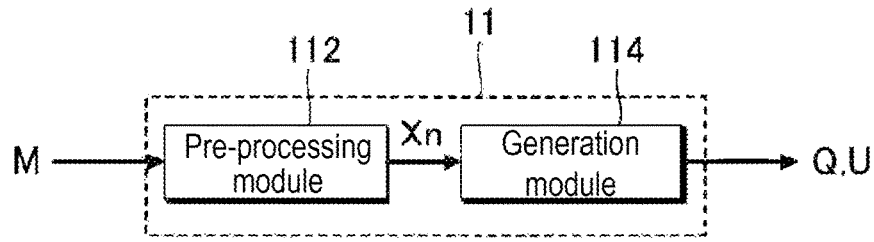
FIG. 3 is a block diagram illustrating a functional configuration of an information processing device.

FIG. 3 is a block diagram illustrating a functional configuration of the information processing device 10. As illustrated in FIG. 3, the electronic controller 11 realizes a plurality of functions (a pre-processing module 112 and a generation module 114) by executing a program stored in the storage device 13. Note that the functions of the electronic controller 11 can be realized by a plurality of devices that are configured separately from each other. Part or all of the functions of the electronic controller 11 can be realized by a dedicated electronic circuit.

The pre-processing module 112 generates first unit data Xn corresponding to the playing data M, for each unit period Tn. FIG. 2 schematically shows the first unit data Xn. As illustrated in FIG. 2, the first unit data Xn corresponding to the unit period Tn includes sound production data An and start point data Bn. The sound production data An is data indicating whether or not there is sound production of each pitch K in the unit period Tn. For example, the sound production data An is expressed by a 128-dimensional binary vector corresponding to the 128 pitches K1 to K128. For example, among 128 bits of the sound production data An, each bit corresponding to a pitch K with sound production (a black line in FIG. 2) is set to 1, and each bit corresponding to a pitch K without sound production is set to 0. When the sound production period E of the pitch K is continuous over a plurality of unit periods Tn, bits corresponding to the pitch K are continuously set to 1 over the sound production data An in the plurality of unit periods Tn. Note that sound production of a plurality of pitches K can be made in a common unit period Tn.

The start point data Bn is data indicating, for each pitch K in the unit period Tn, whether or not the sound production of each pitch K is a start point of sound production (hereinafter referred to as a "sound-production start point"). For example, the start point data Bn is expressed by a 128-dimensional binary vector corresponding to the 128 pitches K1 to K128. For example, among 128 bits of the start point data Bn, each bit corresponding to a pitch K and being a start point (a black line in FIG. 2) is set to 1, and each bit corresponding to a pitch K and being not a start point is set to 0. When the sound production period E of the pitch K is continuous over a plurality of unit periods Tn, a bit corresponding to the pitch K of the start point data Bn corresponding to a leading unit period Tn is set to 1. As can be understood from the above description, a time series of N sets of first unit data X1 to XN respectively corresponding to individual unit periods Tn is generated from the playing data M.

The generation module 114 in FIG. 3 generates key depression data Q and pedal data U from the playing data M. The key depression data Q and the pedal data U are used for automatic playing by the automatic playing musical instrument 20. FIG. 2 schematically shows the key depression data Q and the pedal data U. As illustrated in FIG. 2, the key depression data Q and the pedal data U are both sectioned into N unit periods T1 to TN, similarly to the playing data M. That is, the key depression data Q and the pedal data U having the same time length as that of the playing data M are generated.

The key depression data Q is data representing a period H during which a key corresponding to each pitch K is depressed (hereinafter referred to as a "key depression period"). The key depression period H is a period from the time of starting key depression to the time of ending (that is, key releasing). On the other hand, the pedal data U is data representing a period (hereinafter referred to as an "operation period") S in which the pedal is operated. The operation period S is a period from the time of starting an operation of the pedal to the time of ending.

As the generation module 114, a learned model that has learned a relationship between an input corresponding to the playing data M and outputs corresponding to the key depression data Q and the pedal data U is exemplified. The learned model of the first embodiment, for each unit period Tn, uses the first unit data Xn generated by the pre-processing module 112 as an input, to output second unit data Yn corresponding to the key depression data Q and third unit data Zn corresponding to the pedal data U.

FIG. 2 schematically shows the second unit data Yn and the third unit data Zn generated by the generation module 114. As illustrated in FIG. 2, the second unit data Yn is a portion of the key depression data Q corresponding to the unit period Tn, while the third unit data Zn is a portion of the pedal data U corresponding to the unit period Tn. That is, a time series of the second unit data Y1 to YN of the N unit periods T1 to TN is the key depression data Q, and a time series of the third unit data Z1 to ZN of the N unit periods T1 to TN is the pedal data U.

Specifically, the second unit data Yn is data indicating whether or not there is key depression of a key corresponding to each pitch K. For example, the second unit data Yn is expressed by a 128-dimensional binary vector corresponding to the 128 pitches K1 to K128. For example, among 128 bits of the second unit data Yn, each bit corresponding to a pitch K of a key with key depression (a black line in FIG. 2) is set to 1, and each bit corresponding to a pitch K of a key without key depression is set to 0. When the key depression period H of the pitch K is continuous over a plurality of unit periods Tn, bits corresponding to the pitch K are continuously set to 1 over the second unit data Yn of the plurality of unit periods Tn. That is, the key depression period H corresponding to each pitch K is expressed by a time series of the second unit data Y1 to YN of the N continuous unit periods T1 to TN (that is, the key depression data Q). Note that key depression of a plurality of pitches K can be made in a common unit period Tn. As can be understood from the above description, the key depression data Q is generated by arranging the second unit data Yn in time series for each of the N unit periods T1 to TN.

Specifically, the third unit data Zn is data indicating whether or not there is an operation of the pedal. For example, the third unit data Zn is expressed by one bit. For example, 1 (on) is set when there is an operation of the pedal in the unit period Tn (a black line in FIG. 2), and 0 (off) is set when there is no operation of the pedal in the unit period Tn. When the operation period S is continuous over a plurality of unit periods Tn, 1 is continuously set over the third unit data Zn of the plurality of unit periods Tn. That is, the operation period S of the pedal is expressed by a time series of the third unit data Z1 to ZN of the N continuous unit periods T1 to TN (that is, the pedal data U). As can be understood from the above description, the pedal data U is generated by arranging the third unit data Zn in time series for each of the N unit periods T1 to TN. The sound production period E of the playing data M corresponds to a period obtained by extending a period of sound production based on the key depression period H represented by the key depression data Q, in accordance with a content of the pedal data U.

The learned model is a statistical prediction model that has learned a relationship between the playing data M, and the key depression data Q and the pedal data U. In the first embodiment, a learned model that has learned a relationship between the first unit data Xn, and the second unit data Yn and the third unit data Zn is used. As the learned model, a neural network is used. For example, the learned model includes a plurality of layers of long short term memory (LSTM) units connected in series with each other. The long short term memory unit is a specific example of a recurrent neural network (RNN) suitable for analyzing time series data. Specifically, the learned model is realized by a combination of a program for causing the electronic controller 11 to execute an operation for generating the key depression data Q and the pedal data U from the playing data M (for example, a program module included in artificial intelligence software), and a plurality of coefficients applied to the operation. The plurality of coefficients that define the learned model are set through machine learning (especially deep learning) using a plurality of sets of learning data, and are held in the storage device 13.

Each set of the learning data is data in which the first unit data Xn is associated with correct values of the second unit data Yn and the third unit data Zn. The second unit data Yn and the third unit data Zn are generated by inputting the first unit data Xn of the learning data into a model in which a plurality of coefficients is provisionally set (hereinafter referred to as a "provisional model"). Further, the plurality of coefficients of the provisional model are updated sequentially so as to minimize an evaluation function representing an error between the correct value of the learning data and the generated second unit data Yn and the third unit data Zn. For updating each coefficient according to the evaluation function, for example, the backpropagation algorithm is used. The provisional model at a stage where a predetermined condition is satisfied by repeating the above-described update of the coefficient is used as a definitive learned model.

Figure 4:
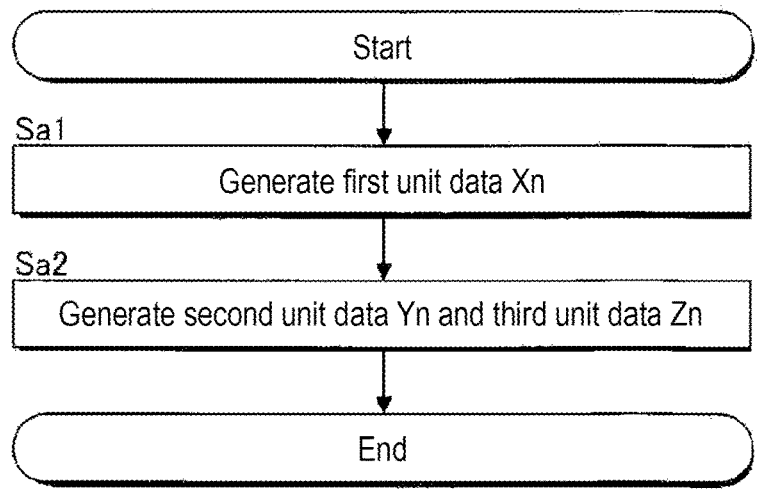
FIG. 4 is a flowchart of a process of a control device.

FIG. 4 is a flowchart illustrating a process executed by the electronic controller 11. The process of FIG. 4 is executed for each unit period Tn. When the process of FIG. 4 is started, the pre-processing module 112 generates the first unit data Xn from the playing data M stored in the storage device 13 (Sa1). The first unit data Xn is generated for each of the N unit periods T1 to TN. The generation module 114 generates the second unit data Yn and the third unit data Zn from the first unit data Xn generated by the pre-processing module 112 (Sa2). As the generation module 114, there is used a learned model that has learned a relationship between an input corresponding to the playing data M (that is, the first unit data Xn), and outputs corresponding to the key depression data Q and the pedal data U (that is, the second unit data Yn and the third unit data Zn). Since the second unit data Yn and the third unit data Zn are outputted for each of the N unit periods T1 to TN, the key depression data Q and the pedal data U are generated.

The automatic playing musical instrument 20 of FIG. 1 executes automatic playing by using the key depression data Q and the pedal data U generated by the information processing device 10. As illustrated in FIG. 1, the automatic playing musical instrument 20 includes a control device 21 in addition to the keyboard 23 and the pedal 25 described above. The control device 21 is, for example, a processing circuit such as a CPU, and integrally controls each element of the automatic playing musical instrument 20. The control device 21 controls an operation of the keyboard 23 and an operation of the pedal 25.

The control device 21 of the first embodiment operates a plurality of keys included in the keyboard 23 in accordance with the key depression data Q. Specifically, the control device 21 starts key depression of the key at a start point of the key depression period H specified for each key by the key depression data Q, and causes key releasing at an end point of the key depression period H. Further, the control device 21 of the first embodiment operates the pedal 25 in accordance with the pedal data U. Specifically, the control device 21 starts an operation of the pedal 25 at a start point of the operation period S specified by the pedal data U, and ends the operation of the pedal 25 at an end point of the operation period S. Under the control described above, the keyboard 23 and the pedal 25 are operated. Therefore, each pitch K subjected to sound production according to the key depression period H of the key depression data Q is extended in accordance with the operation period S of the pedal data U.

As described above, according to the first embodiment, the key depression data Q and the pedal data U are generated from the playing data M. The playing data M of the first embodiment is data representing a playing content of a music piece, in which sound production by key depression and extension of sound production by a pedal operation are not distinguished. In the first embodiment, the pedal data U can also be generated from the playing data M in which the key depression and the pedal operation are not distinguished as described above. Further, even from the playing data M in which the key depression and the pedal operation are not distinguished as described above, the key depression data Q and the pedal data U can be distinguished to be generated. Further, in the first embodiment, since the data representing the sound production period E for each pitch K is used as the playing data M, the key depression data Q and the pedal data U can be appropriately generated in accordance with the sound production period E of each pitch K.

In the first embodiment, the key depression data Q and pedal data U are generated by a learned model that has learned a relationship between an input corresponding to the playing data M and outputs corresponding to the key depression data Q and the pedal data U. Therefore, for example, as compared with a method of generating the key depression data Q and the pedal data U under a regulation in which a predetermined time from a sound-production start point is the key depression period H and a subsequent time is the operation period S of the pedal 25, the key depression data Q and the pedal data U can be appropriately generated from the playing data M. Specifically, under a relationship, which is latent in many learning data used for learning the learned model, between the playing data M, and the key depression data Q and the pedal data U, statistically valid key depression data Q and pedal data U can be generated.

Particularly in the first embodiment, the learned model is a recurrent neural network that uses the first unit data Xn as an input to output the second unit data Yn and the third unit data Zn, for each unit period Tn. Therefore, a time series of the second unit data Yn (that is, the key depression data Q) and a time series of the third unit data Zn (that is, the pedal data U) are generated. Further, the first unit data Xn includes the sound production data An and the start point data Bn. Therefore, it is possible to appropriately generate the key depression data Q and the pedal data U in accordance with whether or not there is sound production of each pitch K and whether or not the sound production of each pitch K is the sound-production start point.

Second Embodiment

A second embodiment of the present disclosure will be described. Note that, in each of the following examples, the elements having the functions similar to those in the first embodiment are denoted by the reference signs used in the description of the first embodiment, and individual detailed description thereof will be appropriately omitted.

Figure 5:
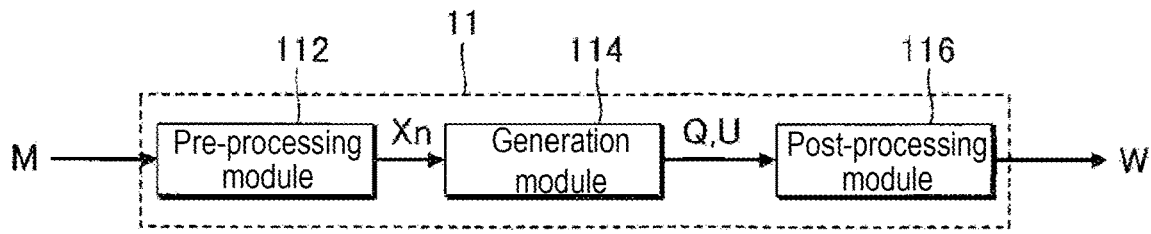
FIG. 5 is a block diagram illustrating a functional configuration of an information processing device according to a second embodiment.

FIG. 5 is a block diagram illustrating a functional configuration of an information processing device 10 according to the second embodiment. As illustrated in FIG. 5, a electronic controller 11 according to the second embodiment realizes a post-processing module 116, in addition to a pre-processing module 112 and a generation module 114 similar to those in the first embodiment.

The post-processing module 116 executes a process (hereinafter referred to as a "correction process") of correcting key depression data Q generated by the generation module 114, in accordance with playing data M. The correction process of the second embodiment is a process of correcting the key depression data Q in accordance with start point data Bn. By the correction process, corrected key depression data W is generated. An automatic playing musical instrument 20 according to the second embodiment executes automatic musical playing in accordance with pedal data U generated by the generation module 114 and the corrected key depression data W generated by the post-processing module 116.

Hereinafter, a specific content of the correction process will be described. The following description exemplifies a case in which the correction process is executed for any given pitch K. However, the correction process can be executed for all target pitches K among the 128 pitches K1 to K128.

<Correction Process 1>

Figure 6:
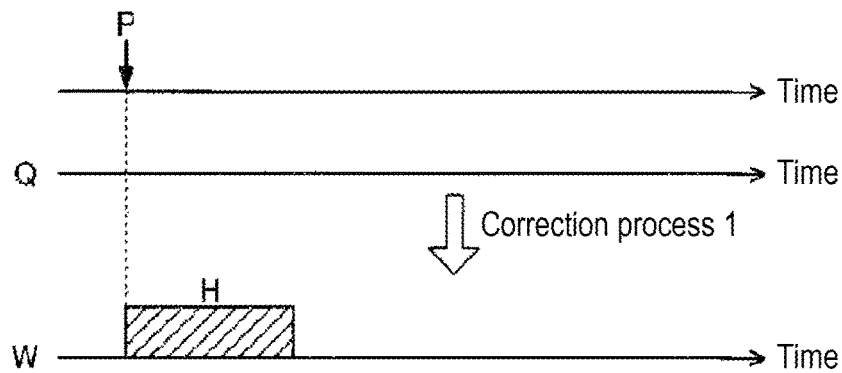
FIG. 6 is an explanatory diagram of a correction process 1.

FIG. 6 is an explanatory diagram for explaining a content of a correction process 1. As shown in FIG. 6, a case is assumed in which, even though a sound-production start point P of the pitch K is present in the start point data Bn, key depression period H corresponding to the sound-production start point P is not present in the key depression data Q. The presence of the sound-production start point P indicates that there should have been key depression. Therefore, it can be inferred that the key depression period H is overlooked. Therefore, in the correction process 1, when there is no key depression period H starting from the sound-production start point P of the start point data Bn in the key depression data Q, the key depression period H of a specified length is added. That is, the post-processing module 116 generates the corrected key depression data W by adding the key depression period H of a predetermined length starting from the sound-production start point P, to the key depression data Q.

According to the correction process 1, when there is no key depression period H starting from the sound-production start point of the start point data Bn in the key depression data Q, the key depression period H of a predetermined length starting from the sound-production start point is added to the key depression data Q. Therefore, it is possible to appropriately add the key depression period H to a place where the key depression period H should actually be present (that is, a point where the generation module 114 has been unable to detect).

<Correction Process 2>

Figure 7:
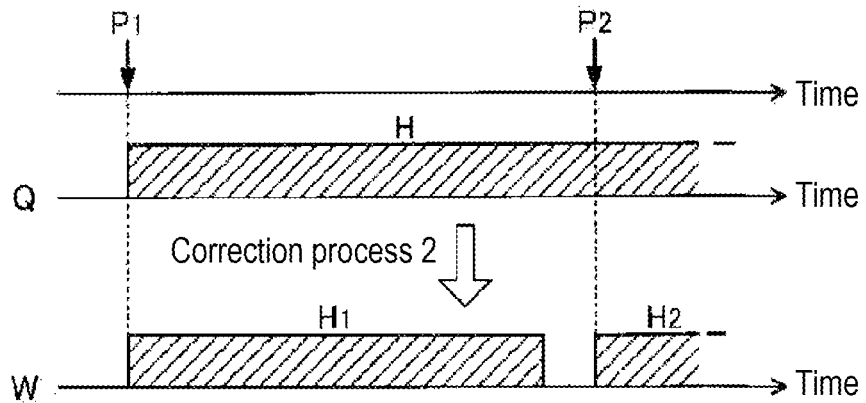
FIG. 7 is an explanatory diagram of a correction process 2.

FIG. 7 is an explanatory diagram for explaining a content of a correction process 2. As shown in FIG. 7, a case is assumed in which, within the key depression period H represented by the key depression data Q, a first sound-production start point P1 is present, and a second sound-production start point P2 is present immediately after the first sound-production start point P1. As described above, when there are two sound-production start points located at different points on a time axis, there should be two key depression periods H respectively corresponding to the two sound-production start points. Therefore, in the correction process 2, within one key depression period H represented by the key depression data Q, when there are a plurality of start points (the first sound-production start point P1 and the second sound-production start point P2) in the start point data Bn, the key depression period H is separated. That is, the post-processing module 116 generates the corrected key depression data W by separating the key depression period H represented by the key depression data Q, into a key depression period H1 starting from the first sound-production start point P1 and a key depression period H2 starting from the second sound-production start point P2.

According to the correction process 2, within the key depression period H represented by the key depression data Q, when there are the first sound-production start point P1 and the second sound-production start point P2, the key depression period H represented by the key depression data Q is separated into the key depression period H1 starting from the first sound-production start point and the key depression period H2 starting from the second sound-production start point. Therefore, by adding the key depression period H2 that is originally necessary, the key depression period H can be appropriately generated for each sound-production start point.

<Correction Process 3>

Figure 8:
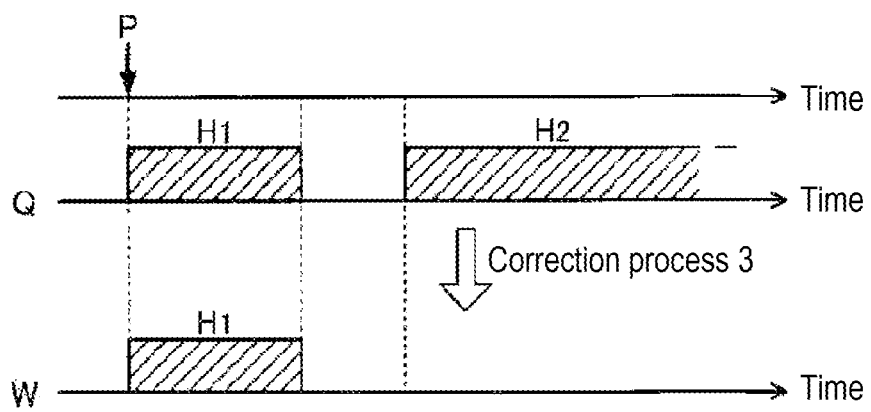
FIG. 8 is an explanatory diagram of a correction process 3.

FIG. 8 is an explanatory diagram for explaining a content of a correction process 3. As shown in FIG. 8, a case is assumed in which the sound-production start point P is not present at a start point of the second key depression period H2 immediately after the first key depression period H1 in the key depression data Q. The first key depression period H1 and the second key depression period H2 are periods separated from each other on a time axis. Note that there is a sound-production start point P corresponding to a start point of the first key depression period H1. When the sound-production start point P is not present, the key depression period H corresponding to the sound-production start point P should not be present. Therefore, it can be inferred that the second key depression period H2 in which the corresponding sound-production start point P is not present is unnecessary. Therefore, in the correction process 3, when the sound-production start point P is not present in the start point data Bn corresponding to the start point of the second key depression period H2 immediately after the first key depression period H1, the second key depression period H2 is deleted. That is, the post-processing module 116 generates the corrected key depression data W by deleting the second key depression period H2 from the key depression data Q.

According to the correction process 3, when the sound-production start point P is not present at the start point of the second key depression period H2 in the key depression data Q, the second key depression period H2 is deleted from the key depression data Q. Therefore, by deleting the key depression period H2 that is originally unnecessary, the key depression period H can be appropriately generated for each sound-production start point P.

<Correction Process 4>

Figure 9:
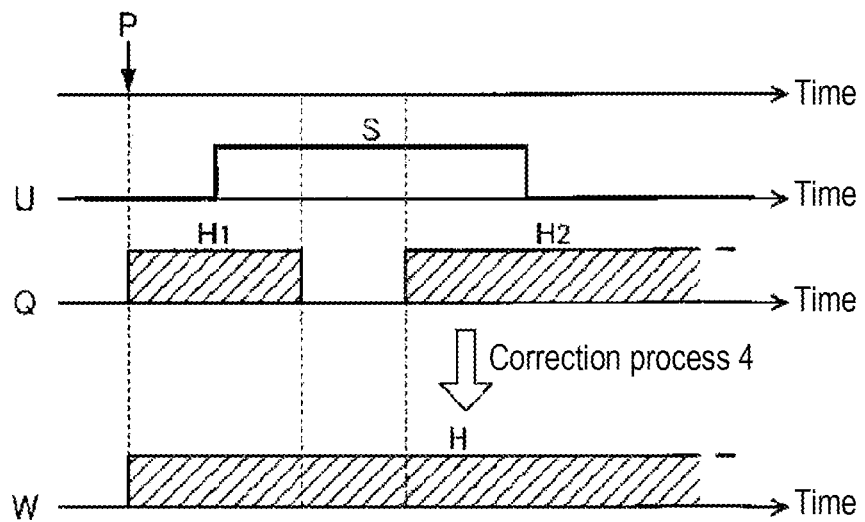
FIG. 9 is an explanatory diagram of a correction process 4.

FIG. 9 is an explanatory diagram for explaining a content of a correction process 4. In the correction process 4, similarly to the correction process 3, a case is assumed in which a sound-production start point is not present at a start point of the second key depression period H2 in the key depression data Q. However, in the correction process 4, the pedal data U generated by the generation module 114 is also taken into account for the correction of the key depression data Q. As shown in FIG. 9, in a case where the operation period S in the pedal data U is continuous over the first key depression period H1 and the second key depression period H2, the correction process 4 is executed. Specifically, this is a case where a start point of the operation period S of the pedal data U is located before an end point of the first key depression period H1, and an end point of the operation period S of the pedal data U is present after a start point of the second key depression period H2.

When the start point of the operation period S is located in the key depression period H, the sound production should be sustained until the end point of the operation period S. Therefore, in the correction process 4, when the sound-production start point P is not present in the start point data Bn corresponding to the start point of the second key depression period H2 in the key depression data Q, and the operation period S in the pedal data U is continuous over the first key depression period H1 and the second key depression period H2, the first key depression period H1 and the second key depression period H2 are connected. That is, the post-processing module 116 generates the corrected key depression data W by connecting the first key depression period H1 and the second key depression period H2 in the key depression data Q.

According to the correction process 4, when the sound-production start point P of the start point data Bn is not present at the start point of the second key depression period H2 in the key depression data Q, and the operation period S in the pedal data U is continuous over the first key depression period H1 and the second key depression period H2, the first key depression period H1 and the second key depression period H2 are connected in the key depression data Q. Therefore, the two key depression periods H1 and H2 that should originally be continuous key depression period H can be appropriately connected.

When the sound-production start point P is not present in the start point data Bn corresponding to the start point of the second key depression period H2 in the key depression data Q, the correction process 3 is executed in principle. However, when the operation period S of the pedal data U extends over the first key depression period H1 and the second key depression period H2, the correction process 4 is exceptionally executed. Note that, in the correction process 4, only the pedal data U can be taken into account for the correction of the key depression data Q. That is, it is not essential to take the start point data Bn into account, in the correction process 4.

Also in the second embodiment, an effect similar to that of the first embodiment is realized. Particularly in the second embodiment, since the key depression data Q is corrected in accordance with the start point data Bn, there is an advantage that the key depression data Q can be corrected so as to appropriately reflect a tendency of the start point data Bn.

Note that the correction process is not limited to the correction processes 1 to 4 described above. For example, a correction process of extending the key depression period H of the key depression data Q in accordance with the playing data M is also exemplified. Further, a configuration of correcting the pedal data U in accordance with the playing data M, a configuration of correcting the key depression data Q in accordance with the pedal data U, or a configuration of correcting the pedal data U in accordance with the key depression data Q is also adopted.

<Modification>

A specific modified aspect to be added to each of the aspects exemplified above will be exemplified below. Any two or more aspects selected from the following examples can be appropriately merged within a range not inconsistent with each other.

(1) In each of the above-described embodiments, the key depression data Q and the pedal data U are generated using the learned model. However, the key depression data Q and the pedal data U can be generated, for example, under a regulation in which a predetermined time from a sound-production start point is the key depression period H and a subsequent time is the operation period S of the pedal. As can be understood from the above description, the generation module 114 is not limited to the learned model.

(2) In each of the above-described embodiments, data representing the sound production period E for each pitch K is used as the playing data M, but the playing data M is not limited to the above example. For example, as the playing data M, acoustic data representing a waveform of playing sound can be used. Further, playing data M representing a time series of an amplitude spectrum (amplitude spectrogram) can be used.

(3) In each of the above-described embodiments, the key depression data Q and the pedal data U are generated from the playing data M of a music piece stored in the storage device 13 in advance. However, the key depression data Q and the pedal data U can be generated from the playing data M, for example, in parallel with generation of the playing data M by sound collection of playing sound by a performer.

(4) In each of the above-described embodiments, there is used a learned model that, for each unit period Tn, uses the first unit data Xn corresponding to the playing data M as an input, to output the second unit data Yn corresponding to the key depression data Q and the third unit data Zn corresponding to the pedal data U, but the learned model is not limited to the above example. For example, a learned model that is inputted with the playing data M and outputs the key depression data Q and the pedal data U can be used. That is, the pre-processing module 112 that generates the first unit data Xn is not essential. As can be understood from the above description, the input corresponding to the playing data M includes the playing data M itself and data generated from the playing data M (for example, the first unit data Xn). Further, the outputs corresponding to the key depression data Q and the pedal data U include the key depression data Q and the pedal data U themselves, data corresponding to the key depression data Q (for example, the second unit data Yn), and data corresponding to the pedal data U (for example, the third unit data Zn). Note that learning data that is used for machine learning for generating the learned model is appropriately changed in accordance with a content of the learned model.

(5) In each of the above-described embodiments, the first unit data Xn for each unit period Tn is inputted to the generation module 114. However, a time series of the first unit data Xn extending over a plurality of unit periods Tn including the unit period Tn can be inputted to the generation module 114. For example, for each of the plurality of unit periods Tn, the first unit data Xn of a predetermined number of unit periods Tn extending from before to after the unit period Tn are inputted to the generation module 114. In the configuration in which a time series of the first unit data Xn of the plurality of unit periods Tn is inputted to the learned model as described above, a learned model without recurrence can also be used. For example, as the learned model, any neural network such as a convolutional neural network (CNN) can be used.

(6) In each of the above-described embodiments, the first unit data Xn includes the sound production data An and the start point data Bn, but the start point data Bn is not essential. That is, it is also possible to generate the key depression data Q and the pedal data U only from the sound production data An. However, according to the configuration in which the first unit data Xn includes the sound production data An and the start point data Bn, the key depression data Q and the pedal data U can be appropriately generated, as compared with a configuration in which the first unit data Xn includes only the sound production data An.

Further, the first unit data Xn can include other data different from the sound production data An and the start point data Bn. For example, the first unit data Xn can include sound volume data representing a sound volume of each unit period Tn. Specifically, as the sound volume data, a multi-valued vector expressing a sound volume in multiple stages is used. According to the above configuration, it is highly possible that a time point at which the sound volume suddenly increases is estimated as a start point of the key depression period H.

(7) In each of the above-described embodiments, the sound production data An expressing the presence or absence of sound production for each pitch K by a binary vector is exemplified, but the sound production data An is not limited to the above example. For example, as the sound production data An, a multi-valued vector representing a strength of sound production for each pitch K in multiple stages can be used. For example, a numerical value for each pitch K in the sound production data An is set to 0 when there is no sound production of the pitch K, and set to a numerical value of multiple stages according to a strength of sound production when there is the sound production of the pitch K.

(8) In each of the above-described embodiments, the second unit data Yn expressing the presence or absence of key depression of a key corresponding to each pitch K by a binary vector is exemplified, but the second unit data Yn is not limited to the above example. For example, as the second unit data Yn, a multi-valued vector representing a strength of key depression in multiple stages for each pitch K can be used. For example, a numerical value for each pitch K of the second unit data Yn is set to 0 when there is no key depression of the pitch K, and is set to a numerical value of multiple stages according to a strength (a depth) of key depression when there is the key depression of the pitch K.

(9) In each of the above-described embodiments, the third unit data Zn expressing the presence or absence of a pedal operation by a binary vector is exemplified, but the third unit data Zn is not limited to the above example. For example, as the third unit data Zn, a multi-valued vector representing a strength of a pedal operation in multiple stages can be used. For example, a numerical value of the third unit data Zn is set to 0 when there is no pedal operation, and set to a numerical value of multiple stages according to a strength of a pedal operation (a degree of depression) when there is the pedal operation.

(10) In each of the above-described embodiments, the information processing device 10 can be mounted on a server device capable of communicating with the automatic playing musical instrument 20, for example, via a communication network such as the Internet.

(11) In each of the above-described embodiments, the automatic playing piano is exemplified as the automatic playing musical instrument 20. However, the automatic playing musical instrument 20 is not limited to the automatic playing piano as long as it is an instrument having a keyboard and a pedal. As the automatic playing musical instrument 20, for example, a marimba capable of automatic playing can be used.

(12) In each of the above-described embodiments, the information processing device 10 including both the pre-processing module 112 and the generation module 114 is exemplified. However, the pre-processing module 112 and the generation module 114 can be realized by separate devices. For example, by transmitting the first unit data Xn generated by the pre-processing module 112 of the information processing device 10 to a server device capable of communicating with the information processing device 10, the generation module 114 of the server device can generate the second unit data Yn and the third unit data Zn. Further, in the second embodiment, the post-processing module 116 can be realized by a device separate from the information processing device 10.

(13) The function of the information processing device 10 according to each of the above-described embodiments is realized by cooperation of a computer (for example, the electronic controller 11) and a program. A program according to an aspect of the present disclosure is provided in a form of being stored in a computer-readable recording medium and installed in the computer. The recording medium is, for example, a non-transitory recording medium, and an optical recording medium (optical disk) such as a CD-ROM is a example. However, a recording medium of any known type such as a semiconductor recording medium or a magnetic recording medium is also included. Note that the non-transitory recording medium includes any recording medium except a transitory propagating signal, and does not exclude a volatile recording medium. Further, the program can be provided to the computer in a form of distribution via a communication network.

(14) An execution subject of artificial intelligence software for realizing the learned model is not limited to the CPU. For example, the artificial intelligence software can be executed by a processing circuit dedicated to a neural network such as a tensor processing unit and a neural engine, or a digital signal processor (DSP) exclusively used for artificial intelligence. Further, a plurality of types of processing circuits selected from the above examples can cooperate to execute the artificial intelligence software.

(15) In each of the above-described embodiments, the generation module 114 generates both the key depression data Q (the second unit data Yn) and the pedal data M (first unit data Xn) from the playing data M (first unit data Xn), but can generate only the pedal data (the third unit data Zn). In this case, the learned model included in the generation module 114 can be made to perform learning based on data in which the first unit data Xn is associated with a correct value of the third unit data Zn (the second unit data Yn is not associated).

From the embodiments exemplified above, the following configurations can be grasped, for example.

An information processing method according to an aspect (a first aspect) of the present disclosure includes generating, from playing data representing a playing content, key depression data representing a key depression period of a key corresponding to each of a plurality of pitches, and pedal data representing an operation period of a pedal that extends sound production by key depression. According to the above aspect, the key depression data and the pedal data can be generated from the playing data representing the playing content.

In an example (a second aspect) of the first aspect, the playing data is data representing a sound production period for each of the pitches. According to the above aspect, since the data representing the sound production period for each of the pitches is used as the playing data, the key depression data and the pedal data can be appropriately generated in accordance with the sound production period of each of the pitches.

In an example (a third aspect) of the second aspect, the key depression data and the pedal data from the playing data are generated by a learned model that has learned a relationship between an input corresponding to the playing data and outputs corresponding to the key depression data and the pedal data. According to the above aspect, the key depression data and the pedal data are generated by a learned model that has learned a relationship between an input corresponding to the playing data and outputs corresponding to the key depression data and the pedal data. Therefore, for example, as compared with a method of generating the key depression data and the pedal data under a regulation in which a predetermined time from a sound-production start point is the key depression period and a subsequent time is the operation period of the pedal, the key depression data and the pedal data can be appropriately generated from the playing data.

In an example (a fourth aspect) of the third aspect, the learned model is a recurrent neural network that, for each unit period, uses first unit data corresponding to the playing data as an input, to output second unit data corresponding to the key depression data and third unit data corresponding to the pedal data. Further, first unit data includes sound production data indicating the presence or absence of sound production of each of the pitches, the second unit data indicates the presence or absence of key depression of a key corresponding to each of the pitches, and the third unit data indicates the presence or absence of an operation of the pedal. According to the above aspect, since the learned model is the recurrent neural network that uses the first unit data as an input to output the second unit data and the third unit data for each unit period, a time series of the second unit data (that is, the key depression data) and a time series of the third unit data (that is, the pedal data) are generated. Further, since the first unit data includes the sound production data indicating the presence or absence of sound production of each of the pitches, it is possible to appropriately generate the key depression data and the pedal data in accordance with the presence or absence of sound production of each of the pitches.

In an example (a fifth aspect) of the fourth aspect, the first unit data includes the start point data indicating, for each of the pitches, whether or not the sound production of each of the pitches is a sound-production start point. According to the above aspect, since the first unit data includes the start point data indicating, for each of the pitches, whether or not the sound production of each of the pitches is the sound-production start point, it is possible to appropriately generate the key depression data and the pedal data in accordance with whether or not the sound production of each of the pitches is the sound-production start point.

In an example (a sixth aspect) of the fifth aspect, the key depression data is corrected in accordance with the start point data. According to the above aspect, since the key depression data is corrected in accordance with the start point data, the key depression data can be corrected so as to appropriately reflect a tendency of the start point data.

In an example (a seventh aspect) of the sixth aspect, when there is no key depression period starting from a sound-production start point of the start point data in the key depression data, a key depression period of a predetermined length starting from the sound-production start point is added to the key depression data. According to the above aspect, when there is no key depression period starting from the sound-production start point of the start point data in the key depression data, a key depression period of a predetermined length starting from the sound-production start point is added to the key depression data. Therefore, it is possible to appropriately add the key depression period to a place where the key depression period should actually be present.

In an example (an eighth aspect) of the sixth aspect or the seventh aspect, within a key depression period represented by the key depression data, when there are a first sound-production start point and a second sound-production start point immediately after the first sound-production start point, the key depression period represented by the key depression data is separated into a key depression period starting from the first sound-production start point and a key depression period starting from the second sound-production start point. According to the above aspect, within the key depression period represented by the key depression data, when there are the first sound-production start point and the second sound-production start point immediately after the first sound-production start point, the key depression period represented by the key depression data is separated into the key depression period starting from the first sound-production start point and the key depression period starting from the second sound-production start point. Therefore, by adding the key depression period that is originally necessary, the key depression period can be appropriately generated for each sound-production start point.

In an example (a ninth aspect) of any of the sixth aspect or the eighth aspect, when there is no sound-production start point in the start point data corresponding to a start point of the second key depression period immediately after the first key depression period in the key depression data, the second key depression period is deleted from the key depression data. According to the above aspect, when there is no sound-production start point at the start point of the second key depression period immediately after the first key depression period in the key depression data, the second key depression period is deleted from the key depression data. Therefore, by deleting the key depression period that is originally unnecessary, the key depression period can be appropriately generated for each sound-production start point.

In an example (a tenth aspect) of any of the sixth aspect or the ninth aspect, when there is no sound-production start point of the start point data at a start point of the second key depression period immediately after the first key depression period in the key depression data, and an operation period in the pedal data is continuous over the first key depression period and the second key depression period, the first key depression period and the second key depression period are connected in the key depression data. According to the above aspect, when there is no sound-production start point of the start point data at the start point of the second key depression period immediately after the first key depression period in the key depression data, and the operation period in the pedal data is continuous over the first key depression period and the second key depression period, the first key depression period and the second key depression period are connected in the key depression data. Therefore, the two key depression periods that should originally be continuous key depression period can be appropriately connected.

An information processing method according to an aspect (the tenth aspect) of the present disclosure includes generating pedal data representing an operation period of a pedal that extends sound production by key depression, from playing data representing a playing content. According to the above aspect, the pedal data can be generated from the playing data representing the playing content.

In the tenth aspect, the generating includes generating the pedal data from the playing data, by a learned model that has learned a relationship between an input corresponding to the playing data and an output corresponding to the pedal data.

An aspect of the present disclosure is realized as an information processing device that executes the information processing method of each aspect described above or a program that causes a computer to execute the information processing method of each aspect exemplified above.

The invention claimed is:

1. An information processing method implemented by a computer for a keyboard musical instrument provided with a pedal function for a pedal to extend sound production of a depressed key representing a pitch of a keyboard thereof, the information processing method comprising:

obtaining playing data representing a playing content that includes key data for operating the keyboard, but does not include any pedal data for operating the pedal; and generating pedal operation data representing a pedal operation period of the pedal from the obtained playing data by a learned model, which is a statistical prediction model generated from machine learning using a plurality of sets of learning data, that has learned a relationship between an input corresponding to the playing data and an output corresponding to the pedal operation data, wherein the playing data is musical instrument digital interface (MIDI) data compliant with a MIDI standard, and includes pitch operation data representing a sound production period for each of a plurality of pitches of the keyboard.

2. The information processing method according to claim 1, wherein the generating further generates key operation data representing a key depression period together with the pedal operation period from the playing data.

3. The information processing method according to claim 2, wherein the generating generates both the pedal operation data and the key operation data from the playing data by the learned model, which has also learned a relationship between the input corresponding to the playing data and an output corresponding to the key operation data.

4. The information processing method according to claim 3, wherein:

the learned model is a recurrent neural network that, for each period, uses first data corresponding to the obtained playing data as an input, to output second data corresponding to the key operation data, and third data corresponding to the pedal operation data, the first data includes sound production data indicating presence or absence of sound production of each of the pitches of the keyboard, the second data indicates presence or absence of a key depression of a key corresponding to each of the pitches, and the third data indicates presence or absence of an operation of the pedal.

5. The information processing method according to claim 4, wherein the first data includes start point data indicating, for each of the pitches, whether or not the sound production of each of the pitches is a sound-production start point.

6. The information processing method according to claim 5, further comprising correcting the key depression data in accordance with the start point data.

7. The information processing method according to claim 1, wherein the generating includes inputting first unit data corresponding to the playing data for each unit period into the learned model and outputting second unit data corresponding to the pedal operation data for each unit period.

8. The information processing method according to claim 7, wherein the first unit data includes start point data indicating, for each pitch in the unit period, whether or not the sound production of each of the plurality of pitches is a start point.

9. An information processing device for a keyboard musical instrument provided with a pedal function for a pedal to extend sound production of a depressed key representing a pitch of a keyboard thereof, the information processing device comprising:

an electronic controller including at least one processor, wherein the electronic controller is configured to execute a plurality of tasks, including:

an obtaining task that obtains playing data representing a playing content that includes key data for operating the keyboard, but does not include any pedal data for operating the pedal; and a generating task that generates pedal operation data representing a pedal operation period of the pedal from the obtained playing data by a learned model, which is a statistical prediction model generated from machine learning using a plurality of sets of learning data, that has learned a relationship between an input corresponding to the playing data and an output corresponding to the pedal operation data, wherein the playing data is musical instrument digital interface (MIDI) data compliant with a MIDI standard, and includes pitch operation data representing a sound production period for each of a plurality of pitches of the keyboard.

10. The information processing device according to claim 9, wherein the generating task further generates key operation data representing a key depression period together with the pedal operation period from the obtained playing data.

11. The information processing device according to claim 10, wherein the generating generates both the pedal operation data and the key operation data from the playing data by the learned model, which has also learned a relationship between the input corresponding to the playing data and an output corresponding to the key operation data.

12. The information processing device according to claim 11, wherein:

the learned model is a recurrent neural network that, for each period, uses first data corresponding to the obtained playing data as an input, to output second data corresponding to the key operation data, and third data corresponding to the pedal operation data, the first data includes sound production data indicating presence or absence of sound production of each of the pitches of the keyboard, the second data indicates presence or absence of a key depression of a key corresponding to each of the pitches, and the third data indicates presence or absence of an operation of the pedal.

13. The information processing device according to claim 12, wherein the first data includes start point data indicating, for each of the pitches, whether or not the sound production of each of the pitches is a sound-production start point.

14. The information processing device according to claim 13, wherein the plurality of tasks further includes a correcting task that corrects the key depression data in accordance with the start point data.

15. The information processing device according to claim 9, wherein the generating task includes inputting first unit data corresponding to the playing data for each unit period into the learned model and outputting second unit data corresponding to the pedal operation data for each unit period.

16. The information processing device according to claim 15, wherein the first unit data includes start point data indicating, for each pitch in the unit period, whether or not the sound production of each of the plurality of pitches is a start point.

17. An information processing method implemented by a computer for a keyboard musical instrument provided with a pedal function for a pedal to extend sound production of a depressed key representing a pitch of a keyboard thereof, the information processing method comprising:

obtaining playing data representing a playing content that includes key data for operating the keyboard, but does not include any pedal data for operating the pedal or any included pedal data for operating the pedal is indistinguishable from the included key data; and generating pedal operation data representing a pedal operation period of the pedal from the obtained playing data, wherein:

the generating further generates key operation data representing a key depression period together with the pedal operation period from the playing data;

the generating generates both the pedal operation data and the key operation data from the playing data by a learned model that has learned a relationship between an input corresponding to the playing data and outputs corresponding to the key operation data and the pedal operation data, the learned model is a recurrent neural network that, for each period, uses first data corresponding to the obtained playing data as an input, to output second data corresponding to the key operation data, and third data corresponding to the pedal operation data, the first data includes sound production data indicating presence or absence of sound production of each of the pitches of the keyboard, the second data indicates presence or absence of a key depression of a key corresponding to each of the pitches, the third data indicates presence or absence of an operation of the pedal, and the first data includes start point data indicating, for each of the pitches, whether or not the sound production of each of the pitches is a sound-production start point.

18. The information processing method according to claim 17, further comprising correcting the key depression data in accordance with the start point data.

* * * * *